(12) United States Patent
Lapointe

(10) Patent No.: US 9,336,567 B2
(45) Date of Patent: May 10, 2016

(54) CONTENT-AWARE WEIGHTED IMAGE MANIPULATIONS

(71) Applicant: Telefonaktiebolaget L M Ericsson (publ), Stockholm (SE)

(72) Inventor: Jean Lapointe, Blainville (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 152 days.

(21) Appl. No.: 14/184,620

(22) Filed: Feb. 19, 2014

(65) Prior Publication Data

US 2015/0170336 A1  Jun. 18, 2015

Related U.S. Application Data

(60) Provisional application No. 61/916,426, filed on Dec. 16, 2013.

(51) Int. Cl.
| | |
|---|---|
| *G06K 9/36* | (2006.01) |
| *G06K 9/46* | (2006.01) |
| *G06T 3/40* | (2006.01) |
| *G06T 7/60* | (2006.01) |
| *G06T 11/60* | (2006.01) |

(52) U.S. Cl.
CPC . *G06T 3/403* (2013.01); *G06T 3/40* (2013.01); *G06T 7/608* (2013.01); *G06T 11/60* (2013.01)

(58) Field of Classification Search
CPC ........... G06T 3/403; G06T 3/40; G06T 7/608; G06T 11/60
USPC .................................................. 382/190, 298
See application file for complete search history.

(56) References Cited

U.S. PATENT DOCUMENTS

| | | | | |
|---|---|---|---|---|
| 5,313,303 | A * | 5/1994 | Ersoz ..................... | H04N 3/223 348/439.1 |
| 5,781,665 | A | 7/1998 | Cullen et al. | |
| 7,171,058 | B2 * | 1/2007 | Luo ........................ | G06T 7/0081 358/453 |
| 8,265,167 | B2 * | 9/2012 | Lynch ................... | G06T 7/0083 375/240.09 |

FOREIGN PATENT DOCUMENTS

| | | |
|---|---|---|
| EP | 0939381 A2 | 9/1999 |
| EP | 1120742 A2 | 8/2001 |
| WO | 2008066930 A2 | 6/2008 |

OTHER PUBLICATIONS

"Kernal (Image Processing)," http://en.wikipedia.org/wiki/Kernel_ (image processing), Wikipedia, last modified Feb. 7, 2014. 4 pages. downloaded on Feb. 19, 2014.

* cited by examiner

*Primary Examiner* — Kanjibhai Patel
(74) *Attorney, Agent, or Firm* — Nicholson De Vos Webster & Elliott, LLP

(57) ABSTRACT

A method in a computing device for performing intelligent weighted image manipulations is described. The method includes determining whether edge image features are distributed evenly across an image. When the edge image features in the image are not distributed evenly across the image, the method further includes cropping the image at the bounds of an overlay region of a desired size that is set at a position within the image to include a largest number of the edge image features. According to an embodiment, when the edge image features in the image are distributed evenly across the image, the method further includes cropping the image at the bounds of the overlay region of a desired size that is set at the center of the image.

18 Claims, 9 Drawing Sheets

Sample Edge Detection Convolution Matrix/Kernel Operation 802

3x3 Pixel grid 812

$$\begin{Bmatrix} 35 & 40 & 41 & 45 & 50 \\ 40 & 40 & 42 & 46 & 52 \\ 42 & 46 & \langle 50 \rangle & 55 & 55 \\ 48 & 52 & 56 & 58 & 60 \\ 56 & 60 & 65 & 70 & 75 \end{Bmatrix} \cdot \begin{bmatrix} -1 & -1 & -1 \\ -1 & 8 & -1 \\ -1 & -1 & -1 \end{bmatrix} \Rightarrow \begin{Bmatrix} -128 \\ 299 \\ -166 \end{Bmatrix} \Rightarrow \langle 5 \rangle$$

Pixel value grid 804     Convolution matrix 806     Intermediate output values 808     Edge pixel value 810

FIG. 8

CONTENT-AWARE WEIGHTED IMAGE MANIPULATIONS

CROSS-REFERENCE TO RELATED APPLICATIONS

This application claims the benefit of U.S. Provisional Application No. 61/916,426, filed Dec. 16, 2013, which is hereby incorporated by reference.

FIELD

Embodiments of the invention relate to the field of image processing; and more specifically, to content-aware weighted image manipulations.

BACKGROUND

Certain applications may involve the manipulation of multiple image files at once. In many cases, these manipulations may not be trivial and need knowledge of more than just the basic information for the image. In these cases, human input is often needed to manipulate these images. However, using human input becomes prohibitively expensive and time consuming when dealing with a large set of images. Many algorithms currently exist for batch image manipulation. However, these algorithms are meant for document acquisition. For example, some of these algorithms are used to archive scanned media. To scan in these media, these algorithms crop the scanned media against a background that is already known to the algorithm. The algorithm removes those parts of the image corresponding to the known background portions. Other algorithms for image manipulation manipulate images based on set rules that are applied identically to each image. For example, an application may add a sepia color to multiple images at once.

SUMMARY

According to an embodiment, a method in a computing device for performing intelligent weighted image manipulations is described. The method includes determining whether edge image features are distributed evenly across an image. When the edge image features in the image are not distributed evenly across the image, the method further includes cropping the image at the bounds of an overlay region of a desired size that is set at a position within the image to include a largest number of the edge image features. According to an embodiment, when the edge image features in the image are distributed evenly across the image, the method further includes cropping the image at the bounds of the overlay region of a desired size that is set at the center of the image.

According to an embodiment, a media server to perform intelligent weighted image manipulations is described. The media server includes a media store to store images. The media server further includes a processor coupled with the media store to execute an image processing module to perform intelligent weighted image manipulations. The image processing module further includes an intelligent aspect ratio cropping module to, for each of the images to be processed, determine whether edge image features are distributed evenly across the image. When the edge image features in the image are not distributed evenly across the image, the intelligent aspect ratio cropping module is to crop the image at the bounds of an overlay region of a desired size that is set at a position within the image to include a largest number of the edge image features. In an embodiment, when the edge image features in the image are distributed evenly across the image, the intelligent aspect ratio cropping module is to crop the image at the bounds of the overlay region of a desired size that is set at the center of the image.

According to an embodiment, a non-transitory computer-readable storage medium having instructions stored therein for performing intelligent weighted image manipulations is described. When the instructions are executed by a processor of a media server, the processor performs operations for determining whether edge image features are distributed evenly across an image. When the processor determines that the edge image features in the image are not distributed evenly across the image, the processor further performs operations for cropping the image at the bounds of an overlay region of a desired size that is set at a position within the image to include a largest number of the edge image features. In an embodiment, when the processor determines that the edge image features in the image are distributed evenly across the image, the processor further performs operations for cropping the image at the bounds of the overlay region of a desired size that is set at the center of the image.

Thus, embodiments of the invention allow for content-based image manipulations in an automatic manner without the need for human interaction. In an embodiment, all manipulations are derived from a same weighting system, so it is possible to combine multiple operations with minimal overhead in term of processing and memory requirements.

BRIEF DESCRIPTION OF THE DRAWINGS

The invention may best be understood by referring to the following description and accompanying drawings that are used to illustrate embodiments of the invention. In the drawings:

FIG. 8 illustrates an example of a convolution matrix used by the edge detection module 106 for performing edge detection according to an embodiment of the invention;

DESCRIPTION OF EMBODIMENTS

Figure 1:
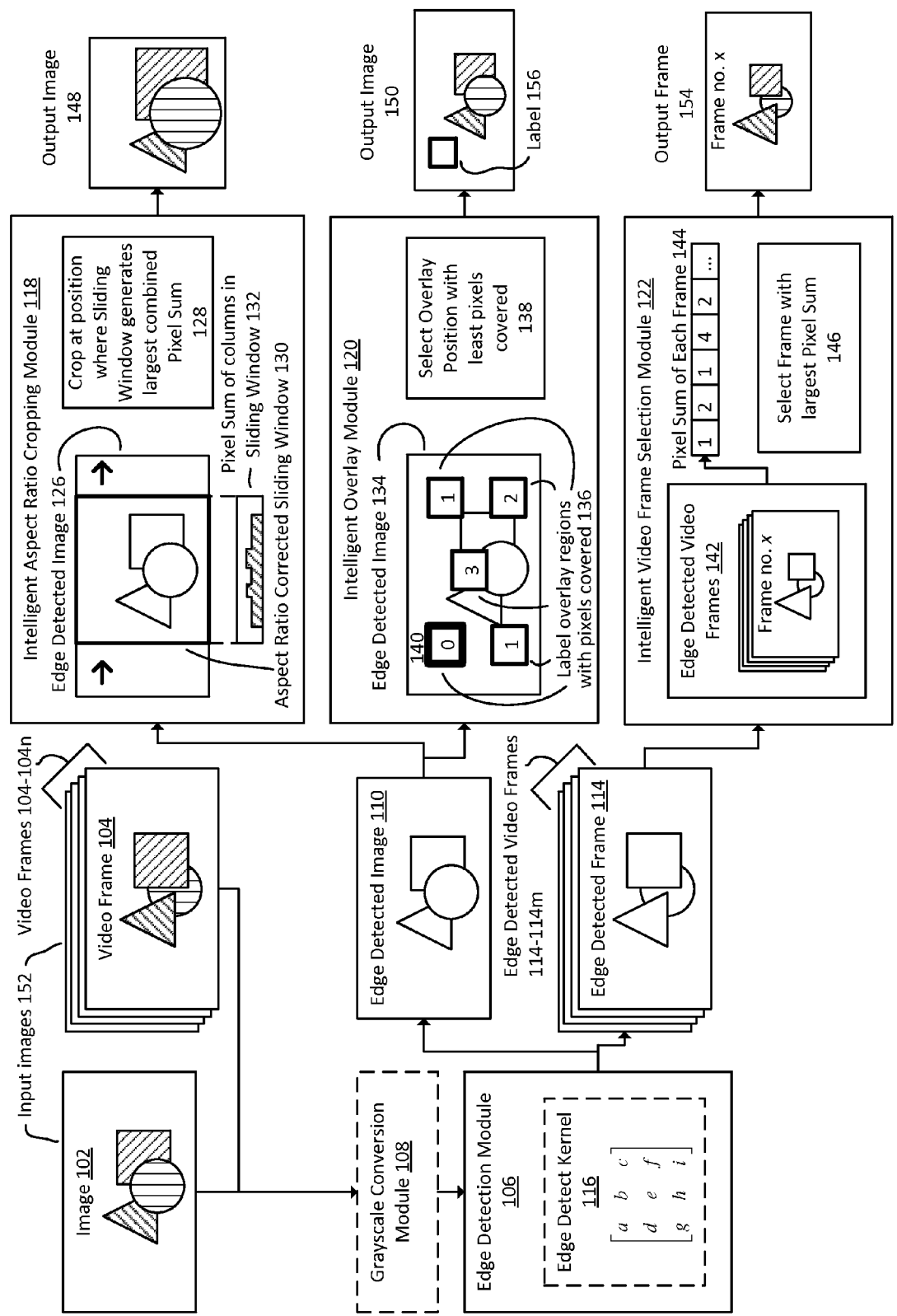
FIG. 1 is a block and flow diagram illustrating aspects of an image processing module 114 performing weighted image manipulations according to an embodiment of the invention.

The following description describes methods and apparatus for content-aware weighted image adaptations. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with an embodiment whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device, such as the media server described herein, stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Using assets designed for today's televisions and film screens on computers and mobile devices is challenging. The aspect ratio of these devices is often different compared to their original sources. As a result, in order to display these assets on various computer and mobile display devices, the images need to be changed to different sizes. Since the images are of various sizes and include diverse variety of content, text and image overlays need to be composed onto the images differently as well. The traditional way of doing this is to use humans to resize and re-compose the images to generate new assets. However, this can become expensive and time consuming once a large number of images need to be processed.

According to embodiments of the invention, the processing of images includes assigning weights to each pixel in the images. To do so, in an embodiment, a convolution matrix is applied to each pixel in the images. The convolution matrix is selected to give a high weight value to pixels representing surface boundaries in the image and a low weight to pixels in the rest of the image. In some embodiments, these weighted pixels are called edge pixels. Once each pixel has been assigned a weight, various automated operations can be performed on the images using the weight values.

In an embodiment, an image may be cropped to have a desired aspect ratio using the weight values. To crop an image to fit a desired aspect ratio, portions of the image are usually cropped from one or two opposite sides of the image. The image is cropped according to the size of an overlay region. In some embodiments, this overlay region is a rectangle with a size proportional to the desired aspect ratio. To determine the portion of the image to keep, the overlay region is placed on the image at a location that bounds a set of pixels with the highest total weight value of all locations. The parts of the image that are not bounded by the overlay region are removed.

However, some images might not be good candidates for this method of cropping as the weights may be distributed fairly evenly across the image such that no location on the image provides a clear distinction against any other location based upon the sum of the weight values under an overlay region placed at that location. To determine if the weights are distributed evenly, in an embodiment, the method determines the areas of the image that are not cropped out regardless of where the overlay region is placed on the image, and then compares the weight values of the two remaining regions of the image which are on opposite sides of the image. If the difference in weight values between these two regions is below a threshold value, the image is considered to have evenly distributed weight values cropped by an alternative algorithm. The alternative algorithm can be but is not limited to cropping the image evenly on each sides (i.e. a center crop).

In an embodiment, layers of text and/or images are added over the image while minimizing the obscuring of important features by the text and/or images through the use of the weight values. To do this, in an embodiment, the method determines the weight values for each of a plurality of potential locations where the text and/or images are to be placed. The text and/or images are placed at the location with the smallest weight value. By placing the text and/or images at this location, a least amount of details of the underlying image is obscured.

In an embodiment, a representative image from a set of images may be automatically determined using weight values. To do this, in an embodiment, the method determines the sum of the weight values of each of a plurality of images. In an embodiment, these images are video frames that are part of a video asset. The image with the highest summed weight value among all the images is selected as the representative image.

In an embodiment, two or more of the operations described above can be combined together. For example, in an embodiment, the method includes cropping a set of images to a desired size where each image is cropped to preserve the most number of details in the image, and finding a representative image in this set of cropped images that includes the most detail of all the cropped images. For example, in an embodiment, the method includes finding the best image in a set of images that is the best candidate to overlay a text and/or image in a particular label location. In an embodiment, the set of images has also been cropped to preserve the most number of details in each of the cropped images.

Accordingly, embodiments of the invention provide context-aware image manipulations that are fully intelligent and automated. These embodiments do not need the input of a human being, and thus in some cases can be performed on exceedingly large image sets without being cost prohibitive or time consuming. Additionally, embodiments of the invention are performed using the same initial calculation of the weighted values of an image(s), and so these embodiments allow many operations to be performed on the image without large overhead.

FIG. 1 is a block and flow diagram illustrating aspects of an image processing module 114 performing weighted image manipulations according to an embodiment of the invention. Input images 152 that are provided to the image processing module 114 may comprise an image 102 or video frames 104-104n comprising one or more individual video frames 104. These video frames 104-104n are still images/frames taken from a video. These input images may or may not be in color, be in black and white, be rectangular, be squared, be compressed using a compression algorithm, or be uncompressed, etc.

In an embodiment, the input images 152 are used by the edge detection module 106 to generate edge detected images 110 and edge detected video frames 114-114m corresponding to the images 102 and the video frames 104-104n, respectively. These edge detected images may have uniform (edge) pixel values at locations on the image where edge features are not represented. For example, all locations where no edge image features are represented in the image may receive a pixel value of 0, or black. Areas of the image where edge image features are represented may receive a pixel value according to the "strength" of the edge. This strength is determined by the particular edge detection method employed by the edge detection module 106 and may also depend upon the pixel values surrounding the edge feature in the image. An edge image feature in the image is a location in the image where an edge is represented in the image. For example, if the image includes a representation of a door, the sides of the door would be edge image features, and may receive high pixel values in the corresponding edge detected image if the edge detection method employed finds this feature to be an edge with high confidence. Likewise, the outline of a person's face would be an edge image feature in an image. These edge image features have a high likelihood of indicating where the details and desirable portions are on the image. Thus, the pixel values of the edge detected image 110 and edge detected frames 114-114m identify where the interesting portions of the respective image and video frames are.

In an embodiment, the edge detection module 106 performs edge detection using an edge detect kernel 116, which is also referred to as a convolution matrix or mask. The edge detection module 106 performs a convolution operation between the image and the kernel to produce a new image that has pixel values representing edge image features in the image as described above. In an embodiment, the image is a color image. Each pixel in a color image comprises three channels of pixel values corresponding to the three primary colors (red, green, and blue). To perform the convolution operation on a color image, in some embodiments, one of the channels of the three is selected as set of pixel values for which the convolution matrix is applied to. In some embodiments, to perform the convolution operation, the input images 152 are first converted to grayscale by the grayscale conversion module 108.

In some embodiments, edge detection is performed using other methods such as differential edge detection and/or other first order and second order methods of edge detection. These edge detection methods produce edge detected images 110 which also indicate where details are within the corresponding input image 152.

In an embodiment, the edge detected images 110 are sent to an intelligent aspect ratio cropping module (IARCM) 118, which determines the best crop location for input images 152 based on where the most details, e.g. edge image features, exist within the input images 152. In some embodiments, the IARCM 118 is used to crop an image that was created for display with one aspect ratio to an image for display with a different aspect ratio, while preserving a high amount of details of the image after the crop.

The IARCM 118 moves a window 130 over the edge detected image 126, and calculates the sum of all pixel values in the window 132. At block 128, IARCM 118 crops the input image 102 at the position of the window 130 that yields the largest pixel sum value 132, i.e. the most detail of the underlying image 102. This cropped image is output image 148.

While FIG. 1 depicts the IARCM 118 as having a sliding window 130 and a set of pixel sum values for that window, these depictions are only for the purposes of clarity and illustration. The IARCM 118 does not need to be implemented by the use of such a sliding window or pixel sum value, and can be implemented in any fashion that would yield a cropped output image preserving the largest amount of details from the underlying image. For example, in an embodiment, the IARCM 118 chooses a location on the edge detected image 126 and directly sums the edge pixel values that would be part of the final cropped image 148 to determine which location results in the largest sum. In an embodiment, the sum of the edge pixel values in each column of the image is stored in an array. The IARCM 118 selects a set of values in the array equal to the number of columns which are desired for the output image 148 and sums these values. The IARCM 118 then iterates one by one through new values in the array and adds the new value to the sum while subtracting the trailing value in the array from the sum. The new array value corresponds to a new column which is added to the sum and the trailing value corresponds to a column which is removed from the sum. After iterating through the entire array, the IARCM 118 is able to determine which set of values on the array, i.e. which position in the image, yields the largest amount of details, and crops the input image 102 at this location.

In an embodiment, one or more of the edge detected images 110 are sent to the intelligent overlay module (IOM) 120. The IOM 120 determines, out of a plurality of label overlay regions 136, which label overlay region 136 has the least number of edge image features or edge detected image pixels (edge pixels) underneath (i.e., bounded by) that label region. In the depicted embodiment, five label overlay regions 136 are defined for the edge detected image 134. The numbers within each label overlay region 136 represents the number of edge image features (i.e., the sum of edge pixel values) underneath that region. At block 138, the label overlay region 136 with the least number of edge image features (i.e., the smallest edge pixel sum) is selected. This selected region is represented by 140 in FIG. 1. The IOM 120 modifies input image 102 by placing label 156 at the selected region 140. The label 156 may be one or more images and/or one or more text labels. This overlaid image is output as 150.

In some embodiments, there are more than five label overlay regions 136, and in some embodiments, there are less than five label overlay regions 136. In these embodiments, the IOM 120 determines amongst the defined set of label overlay regions which label overlay region 136 has the least number of edge image features bounded by that label overlay region and places the desired text and/or images at the location of the region on an input image 152.

In an embodiment, the edge detected video frames 114-114m or multiple edge detected images 110 are sent to the intelligent video frame selection module (IVFSM) 122. IVFSM 122 selects one video frame out of a plurality of frames 142 having the most number of edge image features (i.e., the highest edge pixel sum). The number of edge image features in each frame is represented by 144. At 146, the frame with the largest number of edge image features is selected as a representative frame, and the input frame 104 corresponding to the frame with the most edge image features is output as 154. For the purposes of this discussion, the term "representative" does not strictly need to mean that the image is the most common, but instead means that the image is the most interesting image within the set of images because it includes the most image details, i.e., the most edge image features.

Figure 2:
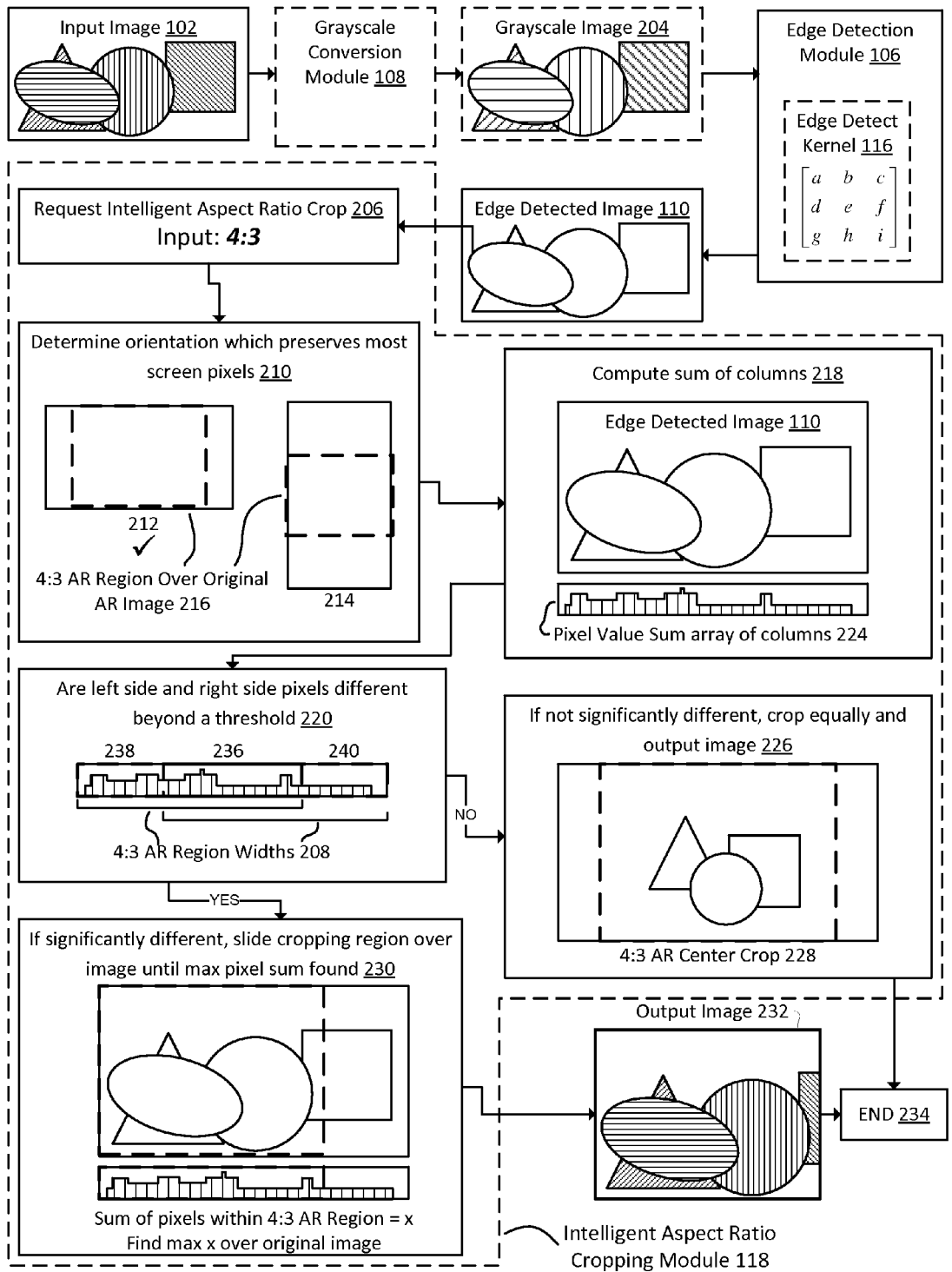
FIG. 2 is a block and flow diagram illustrating exemplary operations of the intelligent aspect ratio cropping module 118 in determining optimal cropping locations according to an embodiment of the invention.

FIG. 2 is a block and flow diagram illustrating exemplary operations of the intelligent aspect ratio cropping module 118 in determining optimal cropping locations according to an embodiment of the invention. The input image 102 is optionally sent through the grayscale conversion module 108 to produce grayscale image 204, and the input image 102 (or grayscale image 204) is sent through edge detection module 106 to produce edge detected image 110. This process is described as above.

At block 206, a crop is requested. In some embodiments, the crop is requested by a user through a user interface with the IARCM 118. In some embodiments, the crop request is determined by a stored list of queued requests for each image. In some embodiments, the IARCM 118 automatically performs the crop based upon a list of destination display devices it is provided with. For example, if the IARCM 118 is provided with a list of display devices and orientations, the IARCM 118 then crops the images based on the properties of the list of display devices without the need for human intervention.

In the example depicted in FIG. 2, a 4:3 aspect ratio (AR) crop is selected, but any other aspect ratio or size may be requested for the crop. In some embodiments, the crop is rectangular crop. In some embodiments, the crop is of an arbitrary shape. In an embodiment, at block 210, the input image 102 is oriented so that when cropped to the requested 4:3 aspect ratio, a largest number of pixels from the input image 102 is preserved. In an embodiment, the 4:3 AR overlay region 216 is set to a largest size not exceeding the size of the input image 102, and the input image 102 is rotated over a plurality of orientations to determine the orientation, that when cropped by the overlay region 216, preserves the largest number of pixels. Here, the two orientations are 212 and 214. Orientation 212, a landscape orientation, preserves the largest number of pixels after cropping. In some embodiments, a particular orientation is requested for the input image 102 and the cropping overlay region 216. For example, the input image 102 is requested to be in a landscape orientation while the cropping window is requested to be in a portrait orientation. In such a case, the orientations used when cropping the image 102 are fixed to these requested orientations.

In some embodiments, at block 218, the pixel value sum array 224 is calculated for the edge detected image 110. This array includes values at each position of the array equal to the sum of the edge pixel values in the corresponding pixel column of the edge detected image 110. Thus, those areas in the image that include a higher number of edge image details have higher values within the corresponding positions of the pixel value sum array 224. As illustrated in FIG. 2, the value in the pixel value sum array 224 is higher in those positions corresponding to columns in edge detected image 110 that have more edge image features. Note that while FIG. 2 depicts an embodiment where a pixel value sum array 224 is calculated, in an embodiment no sum is calculated and instead the IARCM 118 determines the distribution of edge image features directly from the image. Furthermore, while FIG. 2 depicts the pixel value sum array 224 in a bar graph type of representation, this is for the purposes of visualization and the pixel value sum array 224 is an array of values and is not a bar graph.

At block 220, the IARCM 118 determines if the edge features in the image are distributed evenly. In an embodiment, this determination includes using two regions 208 having widths equal to the region used to crop the image, which in the depicted illustration is the 4:3 AR region 216, to split the pixel value sum array 224 into three sections. These three sections comprise a middle section 236 where the two regions 208 overlap, a left side 238 where the two regions 208 do not overlap, and a right side 240 where the two regions 208 do not overlap. The middle section 236 is the section of the image that is present in any resulting cropped image based on the depicted configuration of input image 102 dimensions and overlay region 208 dimension. If the sum of the pixel values of one of the non-overlapping sides does not exceed the other non-overlapping side by at least a threshold value, then the image is considered to have edge features that are evenly distributed and flow proceeds to block 226. Otherwise, flow proceeds to block 230. While this particular method of determining whether the image has evenly distributed edge features is used in this illustration, in some embodiments, different methods are used to determine whether the image has evenly distributed edge features. For example, in an embodiment, the IARCM 118 splits the image into two equal parts and determines that the edge image features in the input image 102 are not evenly distributed when one part has edge features exceeding at least a certain threshold value compared to the other part of the image. As another example, in an embodiment, the IARCM 118 determines that the image is not evenly distributed when any one or closely grouped set of pixel value sums in the pixel value sum array 224 exceed a certain threshold value.

In an embodiment, the threshold value is 20%. In an embodiment, the threshold value is determined by providing a set of images to a group of humans and having them determine which of the images within the set of images have edge features that are evenly distributed and which have edge features that are not evenly distributed. The difference between edge pixel values between the left and right non-overlapping sides (238 and 240 in the depicted embodiment of FIG. 2) for the images are calculated and a threshold value is chosen based on the data gathered. In some embodiments, the threshold values may be based upon user preference. In some embodiments, the threshold value is set by sending a set of sample images through the IARCM 118, and determining the threshold value at which a desired percentage of the total number of images fed in the IARCM 118 are determined to have edge image features that are not evenly distributed. This desired percentage may be determined by a user.

Flow proceeds to block 226 if the edge features in the image are evenly distributed. In the depicted embodiment, the image is cropped at the center of the image using the desired aspect ratio. In the depicted illustration of FIG. 2, the image 102 is cropped at the center with 4:3 AR crop region 228. Flow ends at 234. Note that a center crop is not the only alternative cropping method that the IARCM 118 can apply to an image 102 when the edge image features in the image 102 are determined to be evenly distributed. In some embodiments, the IARCM 118 applies a facial recognition algorithm on the image to determine a location in the image that includes the most number of faces. The image is cropped at this location and is output. Flow ends at 234. In some embodiments, the input image 102 is not cropped to the size of the overlay region 216, but instead a smaller portion of the image is cropped away and additional black bars are overlaid on the sides of the image that were not cropped to have the image match the dimensions of the overlay region 216.

Flow proceeds to block 230 if the edge image features in the image are not evenly distributed. At 230, the image is cropped according to the requested AR at a location to keep the most edge features. In an embodiment, a region having the width of the desired aspect ratio crop size, i.e. 208, is used to partition the pixel value sum array 224. In the depicted embodiment, the IARCM 118 determines that the position of the 208 region that partitions the array 224 to have the highest sum of the pixel values in the pixel value sum array 224 of all possible positions is the position where the image 102 should be cropped by the 4:3 crop region 216. In the depicted embodiment, the highest number of edge features occurs on the left side of the image. This portion of the image is cropped and is output as output image 232. Flow ends at 234. In some embodiments, different methods are used to crop the image at 230. For example, the IARCM 118 may not use a region 208 over a pixel sum value array 224, and instead calculates the sum of the edge pixels in a potential cropping overlay region 216 on the image directly from the image.

Figure 3:
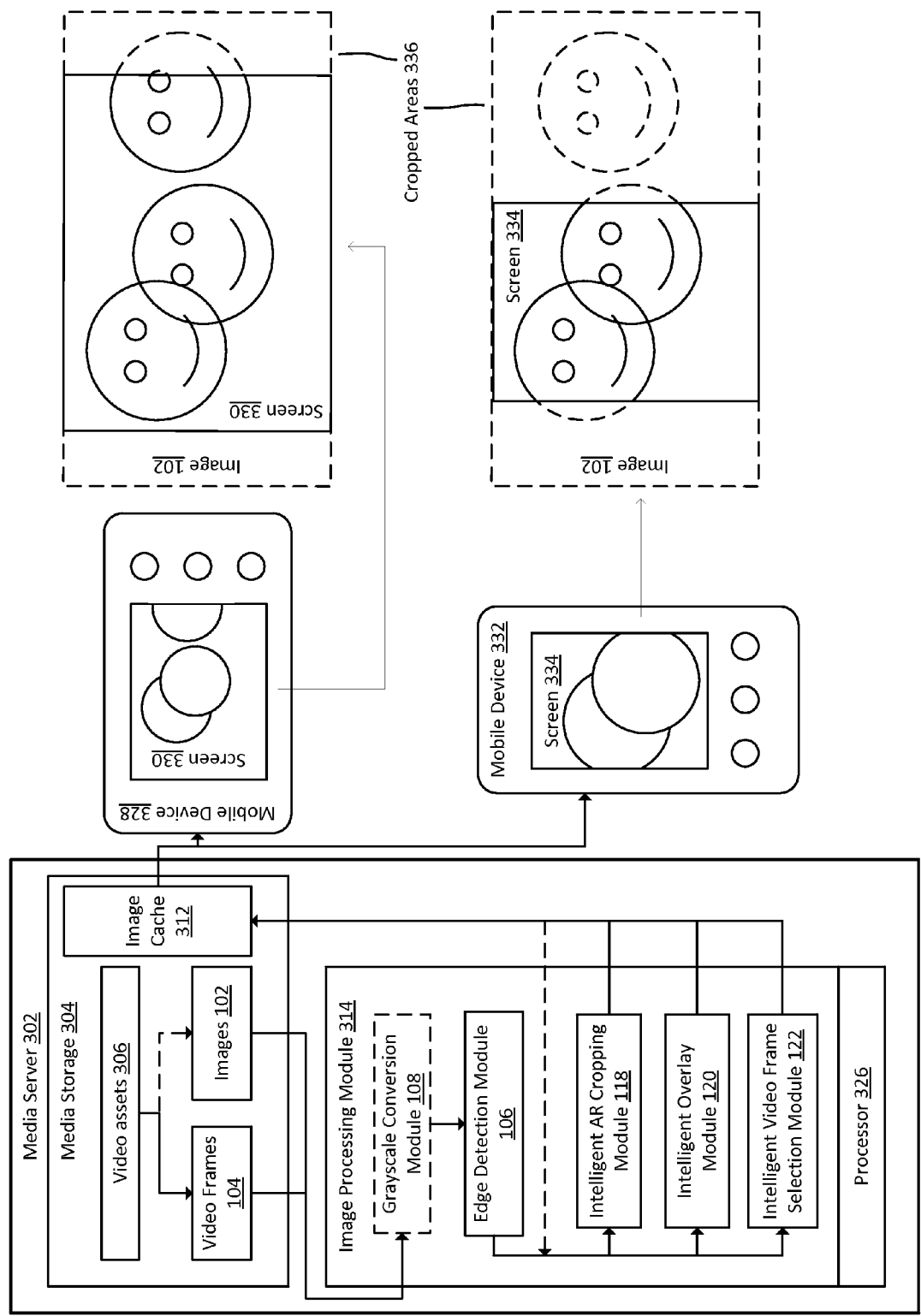
FIG. 3 is a block diagram illustrating a media server and a plurality of exemplary output images to be sent to a display device from the media server, according to an embodiment of the invention.

FIG. 3 is a block diagram illustrating a media server and a plurality of exemplary output images to be sent to a display device from the media server, according to an embodiment of the invention. The media server 302 includes media storage 304 to store video assets 306. Video frames 104 are generated from these video assets 308 and may be separately stored in media storage 304. Media storage 304 also stores images 102, which may be generated from the video assets 306 or may be independently sourced. In some embodiments, media storage 304 includes additional audio or visual media elements.

The video frames 108 and images 102 are provided to the image processing module 314. They are optionally converted to grayscale by the grayscale conversion module 108 and edge detection module 106 to generate edge detected images as described above. These images are further processed by the intelligent AR cropping module 118, the intelligent overlay module 120, and/or the intelligent video frame selection module 122. In some instances, an image is processed by more than one module. This is represented by the dashed line from the output of the three modules 118, 120, and 122 back to the input of these modules. A description of such a combination will be described in detail below. After processing, the processed images may be stored in image cache 312, which is part of media storage 304.

FIG. 3 also illustrates the output from the IARCM 118 and how such an output may be used to output an image to a display device. As depicted, in an embodiment, the image 102 is a widescreen image with a landscape orientation. On mobile device 328, screen 330 has a 4:3 aspect ratio and is also in landscape orientation. In such a case, the cropping module 118 sets the image 102 in landscape orientation and the crop region 216 in landscape orientation as well. The resulting cropped image is displayed on screen 330 as shown in FIG. 3. As shown, most of the image 102 is displayed on the screen 330, with the border of the cropped out region 336 shown as dashed lines.

In an embodiment, mobile device 332 has screen 334 having a portrait orientation with a 4:3 aspect ratio. In this embodiment, the image 102 is still requested to be in a landscape orientation, but the 4:3 AR overlay region 216 is in a portrait orientation instead. As show in FIG. 3, compared to the image on screen 330, less of the image 102 is preserved in the cropped image that is displayed on screen 334. However, because the cropping module 118 crops the image at a location that preserves the most detail, the location of the crops for screen 330 and screen 334 differ. Each screen has a cropped version of the original image 102 that preserves the most detail of the original image in the cropped image, based upon that particular screen's orientation and aspect ratio.

Note that while FIG. 3 depicts particular aspect ratios, screen orientations, and display shapes and dimensions, the IARCM 118 of media server 302 is not limited to supporting only these aspect ratios, screen orientations, and display shapes and dimensions. In some embodiments, the IARCM 118 crops a non-rectangular image of arbitrary shape, to a display device having a screen shape and dimension of another arbitrary shape, dimension, and orientation. In these embodiments IARCM 118 crops the image at a location that preserves the most image features and details of the input image in the cropped image.

Figure 4:
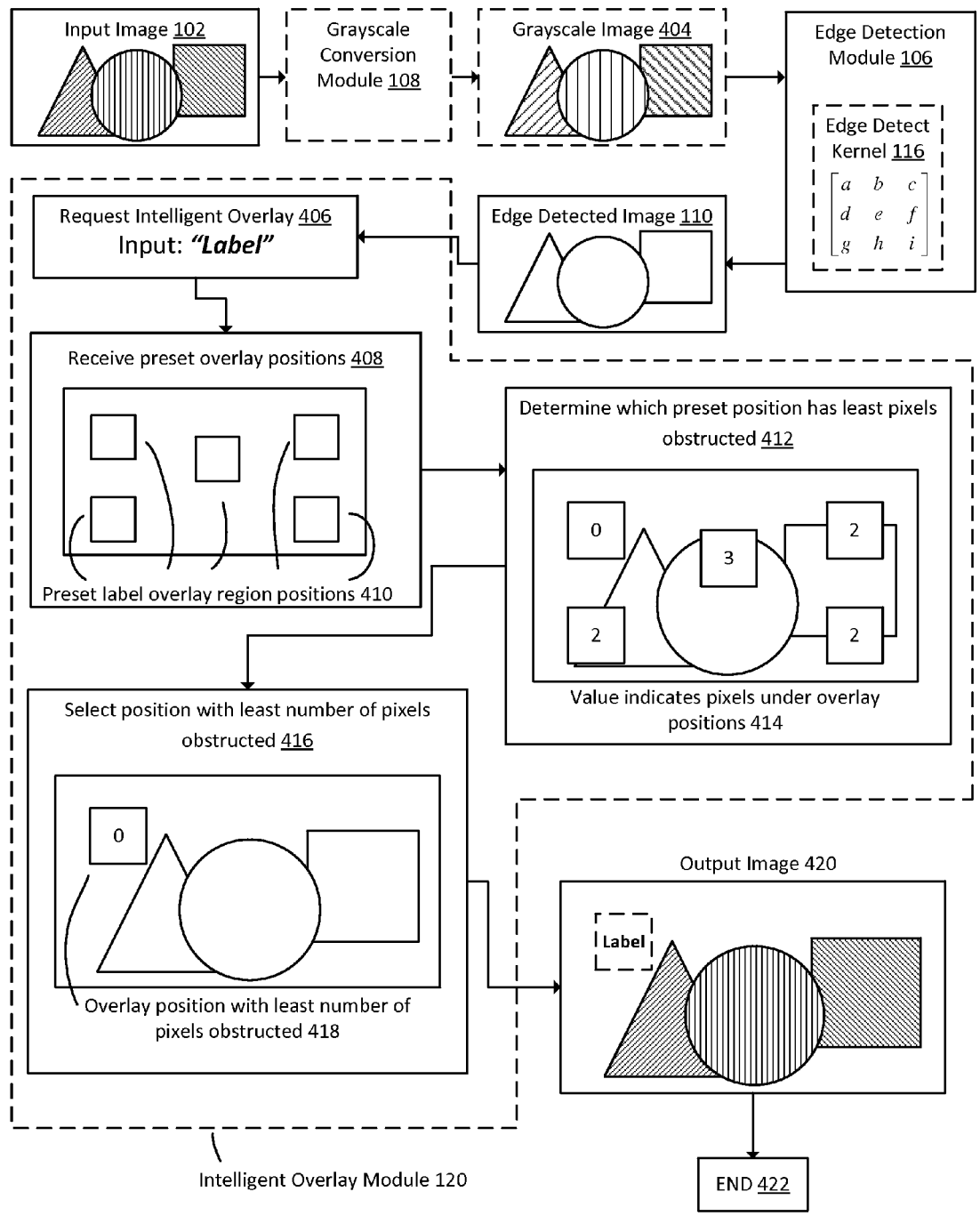
FIG. 4 is a block and flow diagram illustrating exemplary operations of the intelligent overlay module 120 for including a label at an optimal location of an image according to an embodiment of the invention.

FIG. 4 is a block and flow diagram illustrating exemplary operations of the intelligent overlay module 120 for including a label at an optimal location of an image according to an embodiment of the invention. The IOM 120 is configured to place a label on an input image 102 at a position where the label obscures the least number of edge image features of the image. In the depicted embodiment of FIG. 4, image 102 is optionally converted to grayscale via the grayscale conversion module 108 and an edge detected image 110 is generated based upon the image 102 by the edge detection module 106, as described above.

At block 406, an intelligent overlay of a label titled "Label" is requested to be placed on the image 102. In some embodiments, one or more labels and/or one or more images may be requested to be placed on the image 102. In some embodiments, the requests are automated based on a pre-configured list of requests for a corresponding list of images. In some embodiments, a watermark is requested to be placed on the image.

At block 408, the overlay module 120 receives the preset label overlay region positions 410. These regions may be predefined positions on the image at which a label may be placed. In an embodiment, they are determined automatically by the IOM 120. For example, the IOM 120 may determine, based on data from a plurality of related images, areas within all of the plurality of images which do not typically include many edge image features. These locations are automatically determined to be positions for label overlay regions. As another example, the label overlay region positions may be determined based on the size of the text and/or images which may be placed on the image. A large text and/or image item may have to be placed in a location where the entire text and/or image fits on the image. As another example, the positions for label overlay regions may be determined by the content of the image. The IOM 120 may use various object recognition algorithms to determine where certain objects, such as human faces, are present in the image, and set the label overlay region positions next to these objects. In some embodiment, the label overlay region positions are set by a user or administrator.

At block 412, the overlay positions 410 are placed on the edge detected image to determine which position obscures the fewest number of edge image features. The values 414 represent the sum of the edge pixel values obscured by the region under each overlay position. These depicted values may not represent the actual values that the IOM 120 may calculate when performing 412 on an actual image. Instead, these values have been simplified for ease of understanding in the illustration. Of course, in an embodiment, label overlay region positions are not literally placed on the edge detected image; rather the edge pixels in a plurality of pixel locations corresponding to the dimensions of the label overlay region are analyzed instead.

At block 416, the label overlay region position 410 obscuring the least number of edge image features (i.e. the overlay region that corresponds to the lowest edge pixel value sum 414) is selected. In the depicted illustration, this is 418. The image is then output with the label placed at the selected position as 420. Flow then ends at 422. In some embodiments, the position that obscures the least number of edge image features might not be the most desirable position. For example, in some embodiments, when the text and/or image label is placed at this position on an input image 102, a person looking at this newly modified image may not be able to clearly distinguish the label from the input image 102. In such an embodiment, the IOM 120 may employ additional image recognition algorithms to determine whether the placement of the label is ideal or is distinguishable from the background image by at least a threshold amount, and if the placement is not ideal or the label is not distinguishable, the IOM 120 may place the image at another one of the label overlay region positions 410.

Figure 5:
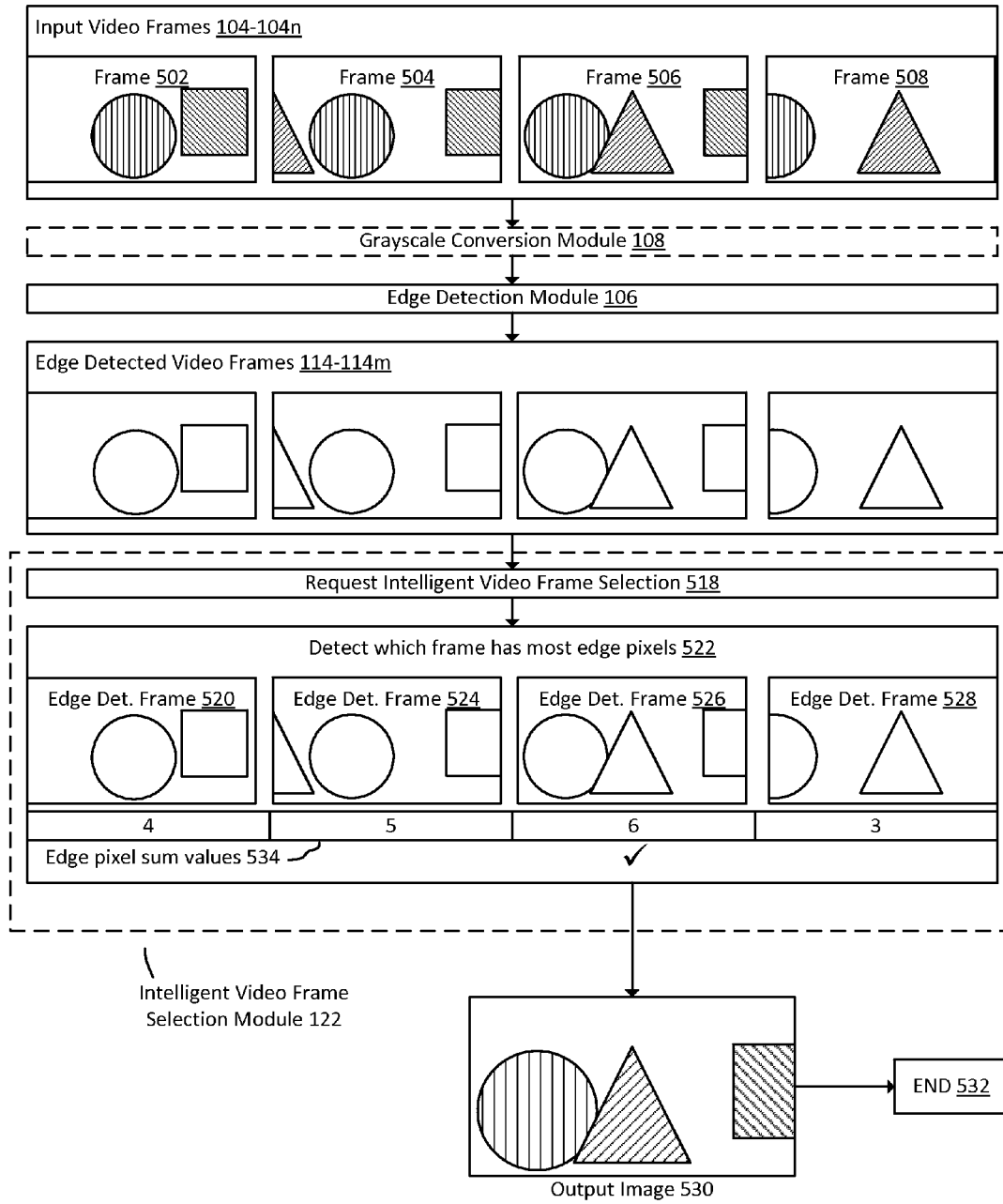
FIG. 5 is a block and flow diagram illustrating exemplary operations of the intelligent video frame selection module 122 in selecting a representative video frame of a video asset according to an embodiment of the invention.

FIG. 5 is a block and flow diagram illustrating exemplary operations of the intelligent video frame selection module 122 in selecting a representative video frame of a video asset according to an embodiment of the invention. The IVFSM 122 selects one frame 104 out of a plurality of video frames 104-104n (or one image out of a plurality of images) that has the most number of edge image features. Input video frames 104-104n are optionally converted by the grayscale module 108 and edge detected video frames 114-114m are generated based upon the input frames 104-104n by the edge detection module 106, as described above.

At block 518, an intelligent video frame selection is requested. In an embodiment, the request comes from a user to the IVFSM 122. This request may be for one or more sets of video frames or plurality of images. In an embodiment, the image processing module 314 is given a list of media assets and a list of various operations to perform on them, including a request to the IVFSM 122 to perform an intelligent video frame selection. In order to perform the intelligent video frame selection, at 522, out of all the edge detected frames 114-114m (or a plurality of images), the IVFSM 122 selects the frame (or image) with the highest sum of edge pixels (i.e. most number of edge image features). In the depicted embodiment, the edge pixel sum values are depicted in edge pixel sum values 534, and each value corresponds to the sum of all the edge pixels of the edge detected image above the value. In the depicted embodiment, the selected frame with the most edge image features is frame 526, with an example edge pixel value sum of 6. This edge pixel sum value of 6 is highest of all the edge pixel sum values 534 as depicted. Note that although frame 526 has a depicted edge pixel value sum of 6, this value may not be representative of an edge pixel value sum of an edge detected image in an implementation of the IVFSM 122. The original input frame 506 corresponding to this edge detected frame is selected and output as output image 530. Flow ends at block 532.

In some embodiments, the selection criteria for the frame are different from that described above. For example, in an embodiment, a frame is selected from the set of input video frames 104-104n that have a highest sum of edge pixel values within a sub-region of the image. As another example, in an embodiment, an object detection algorithm is used to select the frame that has the most number of human faces. As yet another example, the IVFSM 122 also excludes frames which contain motion blurring.

In some embodiments, one or more frames 104-104n (or images) may have edge pixel value sums that are identical or nearly identical. In such an embodiment, an alternate algorithm may be used to determine which frame to choose out of these frames with identical or near identical edge pixel value sums. For example, the alternate algorithm may use face or object detection on the frames to determine which frame has more interesting or varied objects or faces.

Figure 6:
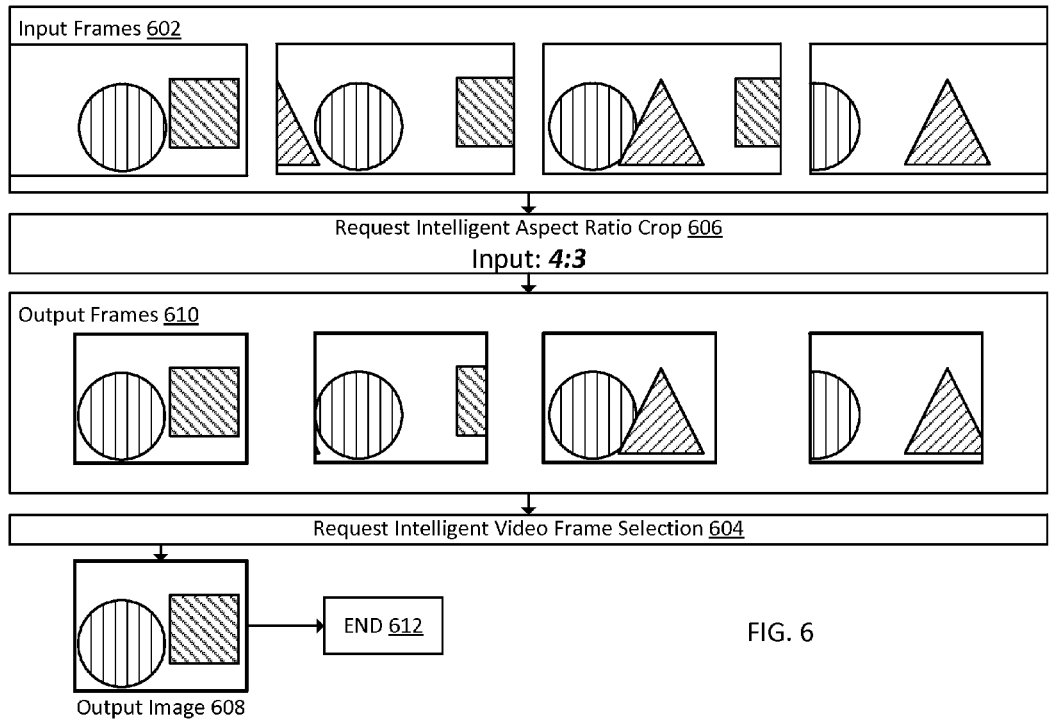
FIG. 6 is a block and flow diagram illustrating exemplary operations utilizing a combination of the intelligent aspect ratio cropping module 118 and the intelligent video frame selection module 122 in selecting a representative cropped video frame from the video frames of a video asset according to an embodiment of the invention.

FIG. 6 is a block and flow diagram illustrating exemplary operations utilizing a combination of the intelligent aspect ratio cropping module 118 and the intelligent video frame selection module 122 in selecting a representative cropped video frame from the video frames of a video asset according to an embodiment of the invention. At 606, an aspect ratio crop is requested for input frames 602 to generate the output frames 610. In an embodiment, the process illustrated in FIG. 2 is used on the input frames 602 to generate output frames 610. In the depicted embodiment, an aspect ratio of 4:3 is requested for the crop. In an embodiment these output frames 610 have been cropped at a location to preserve the most detail of the input frames 602. A intelligent video frame selection 604 is then requested for the output frames 610 and the output frame that has the most detail out of all the output frames 610 is selected as output image 608. Flow ends at block 612.

In the depicted embodiment, the output frame that has the most edge image details is selected from a plurality of frames 602 of a video asset where the frames have already been cropped to a desired aspect ratio. In some embodiments, one or more frames (or images) may have edge pixel value sums that are identical or nearly identical. In such an embodiment, an alternate algorithm may be used to determine which frame to choose out of these frames. For example, the alternate algorithm may use face or object detection on the frames to determine which frame has more interesting or varied objects or faces. As another example, the alternate algorithm may detect if the frame has motion blurring, and select the frame which has the least amount of motion blurring.

Figure 7:
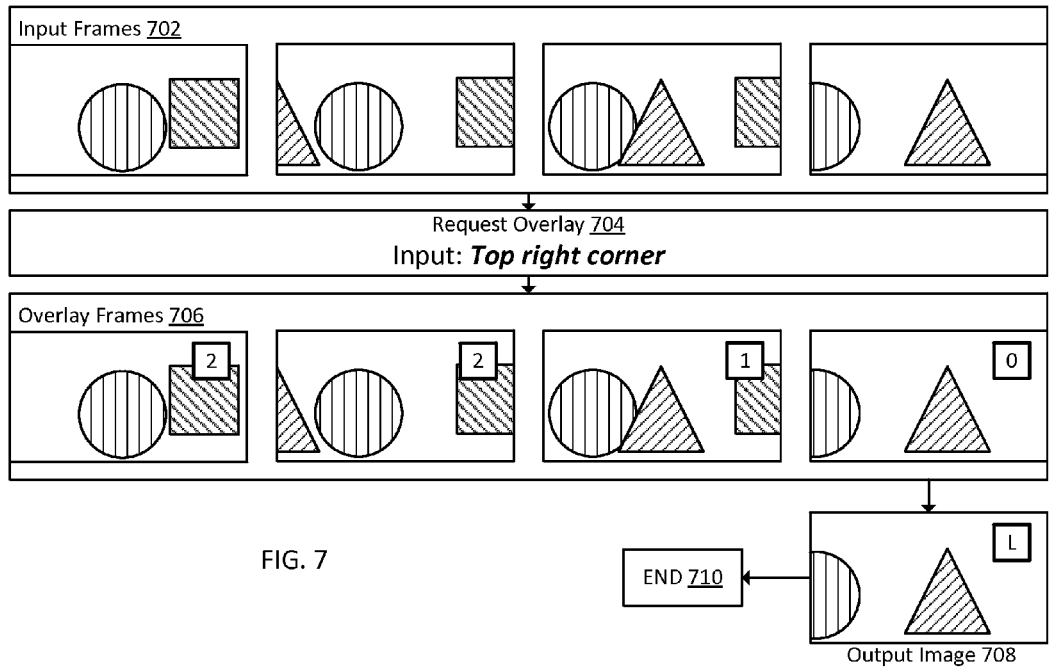
FIG. 7 is a block and flow diagram illustrating exemplary operations of the intelligent overlay module 120 in selecting a representative video frame of a video asset for overlaying a label over an image according to an embodiment of the invention.

FIG. 7 is a block and flow diagram illustrating exemplary operations of the intelligent overlay module 120 in selecting a representative video frame of a video asset for overlaying a label over an image according to an embodiment of the invention. An intelligent overlay request 704 is requested for multiple input frames 702 (or images 102). A label overlay region position is also provided at 704 to the intelligent overlay module 120. In the depicted illustration, this position is the top right corner of the image. The overlay module 120 determines which edge image features which are obscured by an label overlay region position at the requested position, and the image that has a label overlay region position which obscures the least number of underlying edge image features is selected and output as output image 708. Flow ends at 710. Of course, in an embodiment, the label overlay region position is not literally placed on the edge detected image; rather the edge pixels in a plurality of pixel locations corresponding to the dimensions of the label overlay region are analyzed instead. In some embodiments, more than one label overlay region position is provided to the IOM 120 at 704. In such an embodiment, the IOM 120 selects the one label overlay region position out of all the label overlay region positions in all the frames which obscures the least number of edge image features.

FIG. 8 illustrates an example of a convolution matrix used by the edge detection module 106 for performing edge detection according to an embodiment of the invention. Pixel value grid 804 indicates a five by five grid of pixel values for an image. In an embodiment, these pixels are grayscale values for an image. These pixel values may comprise only a portion of the pixel values for the entire image. Convolution matrix 806 indicates the convolution matrix used on the pixel values. The pixel values in pixel value grid 804 immediately surrounding the central pixel value of 50 (denoted by angle brackets) form a three by three grid of pixel values 812. Each pixel value in the corresponding row in the corresponding column of the three by three grid 812 in pixel value grid 804 is multiplied by the corresponding row and column value of convolution matrix 806. For each row, this produces three values. These values are summed to generate the value in the corresponding row in intermediate output values 808. For example, for the first row in the three by three grid, the operation is: $40*-1+42*-1+46*-1=-128$. The three values in intermediate output values 808 are then summed to produce the final value of 5 indicated by edge pixel value 810. In the resulting edge detected image 110, the pixel value at the same location in the original image 102 indicated by the angle bracket in pixel value grid 804, i.e. 50, is replaced by the edge pixel value in 810, i.e. 5. The value of 50 represents the value of a pixel at that location in the input image 102. For example, if the image is a grayscale image and each pixel is an 8-bit value, a pixel value of 0 represents the color black and a pixel value of 255 represents the color white. Any value in-between these two represents a corresponding shade of gray. Thus, the pixel value of 50 represents a shade of gray. The edge pixel value 810, which is placed at the same location as pixel with the pixel value of 50, is part of a larger edge detected image 110. This edge detected image, which is generated from the input image 102, may also have pixel values ranging from 0 to 255 (8 bits). In some embodiments, a pixel value of 0 in this edge detected image 110 indicates that an edge image feature does not exist at this location on the image, while a value of 255 indicates that an edge image feature is almost certain to exist. This phenomenon occurs because the convolution matrix 806 as configured generates higher edge pixel values 810 for areas of the input image 102 where large contrasts between adjacent pixel values exist. A high contrast between adjoining pixel values likely indicates that an edge image feature exists at this location. In some embodiments, this convolution matrix is also applied to video frames 104 to produce edge detected video frames 114.

Figure 9:
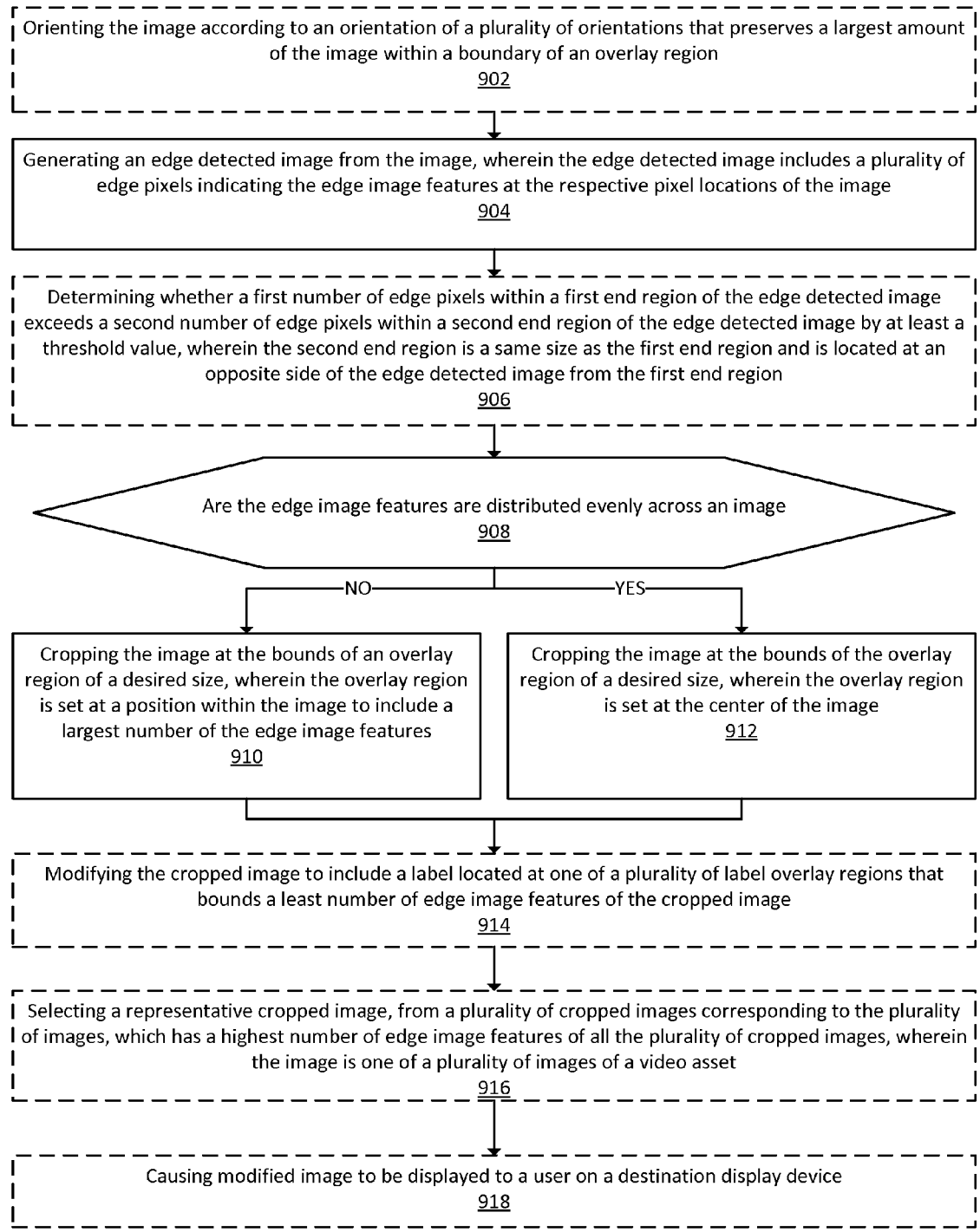
FIG. 9 is a flow diagram illustrating a processing path within the image processing module for performing content-aware weighted image manipulations according to an embodiment of the invention.

FIG. 9 is a flow diagram illustrating a processing path within the image processing module for performing content-aware weighted image manipulations according to an embodiment of the invention. At block 902, the image processing module 314 optionally orients the image 102 according to an orientation of a plurality of orientations that preserves a largest amount of the image 102 within a boundary of an overlay region 216. In some embodiments, the dimensions of the overlay region correspond to an aspect ratio of a display device that the cropped image is to be sent to. In some embodiments, these dimensions are a largest proportional size, according to the aspect ratio, not exceeding the size of the image. At block 904, the image processing module 314 optionally generates an edge detected image 110 from the image 102, wherein the edge detected image includes a plurality of edge pixels indicating the edge image features at the respective pixel locations of the image. At block 906, the image processing module 314 optionally determines whether a first number of edge pixels within a first end region of the edge detected image 110 exceeds a second number of edge pixels within a second end region of the edge detected image 110 by at least a threshold value, wherein the second end region is a same size as the first end region and is located at an opposite side of the edge detected image from the first end region.

At block 908, if the image processing module 314 determines that the edge image features are distributed evenly across an image, flow proceeds to block 912. Otherwise, flow proceeds to block 910. At block 910, the image processing module 314 crops the image 102 at the bounds of an overlay region 216 of a desired size, wherein the overlay region is set at a position within the image to include a largest number of the edge image features. At block 912, the image processing module 314 crops the image at the bounds of the overlay region 216 of a desired size, wherein the overlay region is set at the center of the image 102. In some embodiments, the edge image features are locations of the image that include edges of elements represented within the image.

In some embodiments, the edge image features are determined to be not distributed evenly across the image when the determination of block 906 determines that the first end region does exceed the second end region by at least a threshold value. In some embodiments, the edge image features are determined to be not distributed evenly across the image when one of two non-overlapping regions created by placing two copies of the overlay region 216 at opposite ends of the image 102 exceeds the other non-overlapping region by at least a threshold value.

At block 914, the image processing module 314 optionally modifies the cropped image 232 to include a label 156 located at one of a plurality of label overlay regions 410 that bounds a least number of edge image features of the cropped image 232. In an embodiment, this is performed by the IOM 120. At block 916, the image processing module 314 selects a representative cropped image 608, from a plurality of cropped images 610 corresponding to the plurality of images 602, which has a highest number of edge image features of all the plurality of cropped images 610, wherein the image is one of a plurality of images of a video asset 306. At block 918, the modified image is optionally caused to be displayed to a user on a destination display device. In some embodiments, this display device is mobile device 328 or 332.

Figure 10:
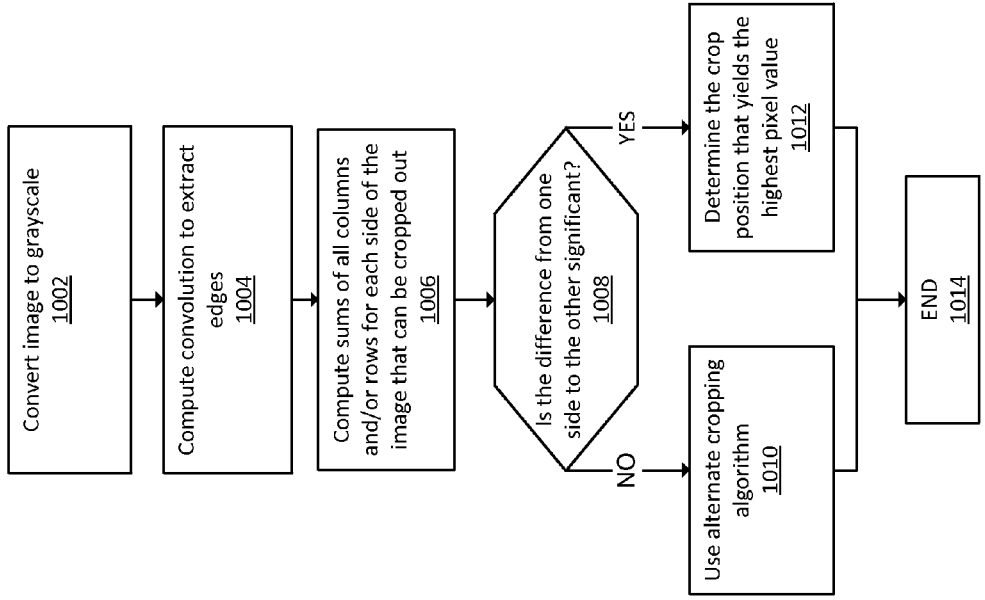
FIG. 10 is a flow diagram illustrating an aspect ratio crop for performing content-aware weighted image manipulations according to an embodiment of the invention.

FIG. 10 is a flow diagram illustrating an aspect ratio crop for performing content-aware weighted image manipulations according to an embodiment of the invention. In an embodiment, this process is performed by the image processing module 314. At block 1002, input images 102 are converted to grayscale. In an embodiment this is performed by the grayscale conversion module 108. At block 1004 an edge detected image 110 is generated from the grayscale image by applying a convolution matrix. In an embodiment this is performed by the edge detection module 106. At block 1006 the sum of the columns and/or the rows for the image are calculated. In an embodiment, this generates the pixel sum array 224. At block 1008, the image processing module 314 determines if one side of the image 102 is significantly different from the other side, based on the edge image features of the image. In some embodiments, this calculation is performed based on the sums of all columns and/or rows calculated in block 1006. If there is a significant difference, flow proceeds to block 1012. Otherwise, flow proceeds to block 1010. In some embodiments, the two sides of the image are significantly different if the sum of the edge pixel values of one side exceed the other side by at least a threshold value.

At block 1010, an alternative cropping algorithm is used on the image 102. In an embodiment this algorithm crops the image at the center of the image. At block 1012, the image is cropped at the crop position that yields the highest edge pixel value. In an embodiment, this edge pixel value is the sum of the pixels under the crop region as represented by the pixel sum array 224. Flow ends at block 1014.

Figure 11:
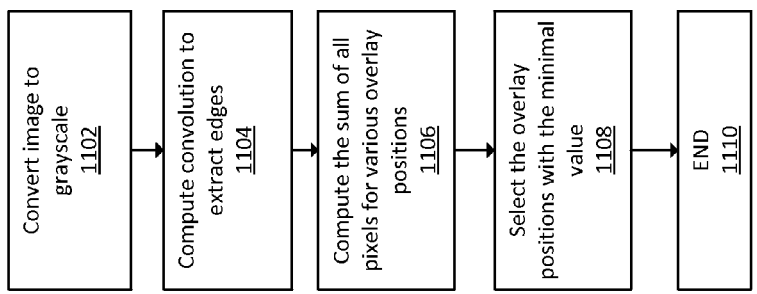
FIG. 11 is a flow diagram illustrating an intelligent overlay for performing content-aware weighted image manipulations according to an embodiment of the invention.

FIG. 11 is a flow diagram illustrating an intelligent overlay for performing content-aware weighted image manipulations according to an embodiment of the invention. In an embodiment, this process is performed by the image processing module 314. At 1102, the input image 102 is converted to grayscale. In an embodiment this is performed by the grayscale module 108. At block 1104 an edge detected image 110 is generated from the grayscale image by applying a convolution. In an embodiment this is performed by the edge detection module 106. At 1106, for each overlay position, the edge pixels obscured by that overlay position is calculated. At block 1108, the position with the least number of edge pixels obscured is selected. At block 1110, flow ends.

Figure 12:
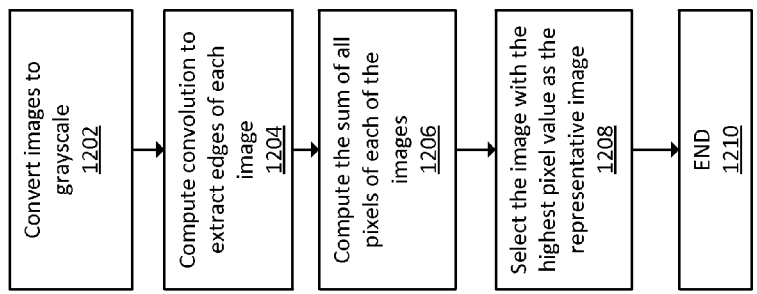
FIG. 12 is a flow diagram illustrating the intelligent video frame selection for performing content-aware weighted image manipulations according to an embodiment of the invention.

FIG. 12 is a flow diagram illustrating the intelligent video frame selection for performing content-aware weighted image manipulations according to an embodiment of the invention. In an embodiment, this process is performed by the image processing module 314. At 1202, the input frames 104-104n are converted to grayscale. In an embodiment this is performed by the grayscale module 108. At block 1204 edge detected video frames 114-114m are generated from the grayscale video frames by applying multiple convolutions. In an embodiment this is performed by the edge detection module 106. At block 1206, the edge pixels of each video frame is summed. At block 1208, the input frame with the highest corresponding to the frame with the highest sum is selected. Flow ends at block 1210.

Although the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a computing device for performing intelligent weighted image manipulations, the method comprising:
    determining whether edge image features are distributed evenly across an image, wherein the edge image features are not distributed evenly across the image when one of two non-overlapping regions created by placing two copies of an overlay region at opposite ends of the image has a first number of edge image features that exceeds a second number of edge image features of the other non-overlapping region by at least a threshold value; and
    when the edge image features in the image are not distributed evenly across the image, cropping the image at the bounds of the overlay region of a desired size, wherein the overlay region is set at a position within the image to include a largest number of the edge image features, wherein the dimensions of the overlay region correspond to an aspect ratio of a display device that the cropped image is to be sent to, and wherein the dimensions are a largest proportional size, according to the aspect ratio, not exceeding the size of the image.

2. The method of claim 1, further comprising:
    when the edge image features in the image are distributed evenly across the image, cropping the image at the bounds of the overlay region of the desired size, wherein the overlay region is set at the center of the image.

3. The method of claim 1, wherein the edge image features are locations of the image that include edges of elements represented within the image.

4. The method of claim 3, further comprising:
    modifying the cropped image to include a label located at one of a plurality of label overlay regions that bounds a least number of edge image features of the cropped image.

5. The method of claim 3, wherein the image is one of a plurality of images of a video asset, wherein the method further comprises:
    selecting a representative cropped image, from a plurality of cropped images corresponding to the plurality of images, which has a highest number of edge image features of all the plurality of cropped images.

6. The method of claim 1, further comprising:
    prior to the determining, orienting the image according to an orientation of a plurality of orientations that preserves a largest amount of the image within a boundary of the overlay region.

7. The method of claim 1, wherein said determining whether edge image features are distributed evenly across an image comprises:
    generating an edge detected image from the image, wherein the edge detected image includes a plurality of edge pixels indicating the edge image features at the respective pixel locations of the image; and determining whether a first number of edge pixels within a first end region of the edge detected image exceeds a second number of edge pixels within a second end region of the edge detected image by at least the threshold value, wherein the second end region is a same size as the first end region and is located at an opposite side of the edge detected image from the first end region.

8. A media server to perform intelligent weighted image manipulations, comprising:
a memory storing instructions;
a media store to store images; and
a processor coupled with the media store and with the memory to execute the instructions to implement an image processing module to perform intelligent weighted image manipulations, the image processing module including, an intelligent aspect ratio cropping module to, for each of the images,
determine whether edge image features are distributed evenly across the image by determining whether a first number of edge pixels within a first end region of the edge detected image corresponding to the image exceeds a second number of edge pixels within a second end region of the edge detected image by at least a threshold value, wherein the second end region is a same size as the first end region and is located at an opposite side of the edge detected image from the first end region, and
when the edge image features in the image are not distributed evenly across the image, crop the image at the bounds of an overlay region of a desired size, wherein the overlay region is set at a position within the image to include a largest number of the edge image features; and
an edge detection module to generate edge detected images from the images, wherein each edge detected image includes a plurality of edge pixels indicating edge image features at the respective pixel locations of the respective image.

9. The media server of claim 8, wherein the intelligent aspect ratio cropping module is further, for each of the images, to:
when the edge image features in the image are distributed evenly across the image, crop the image at the bounds of the overlay region of the desired size, wherein the overlay region is set at the center of the image.

10. The media server of claim 8, wherein the image processing module further comprises a intelligent overlay module to, for one of the cropped images, modify the one cropped image to include a label located at one of a plurality of label overlay regions that bounds a least number of edge image features of the one cropped image.

11. The media server of claim 8, wherein the image processing module further comprises a intelligent video frame selection module to:
select a representative cropped image, from the plurality of cropped images corresponding to a plurality of the images, which has a highest number of edge image features of all the plurality of cropped images.

12. A non-transitory computer-readable storage medium having instructions stored therein for performing intelligent weighted image manipulations, wherein the instructions, when executed by a processor of a media server, cause the processor to perform operations comprising:
determining whether edge image features are distributed evenly across an image, wherein the determining comprises:
generating an edge detected image from the image, wherein the edge detected image includes a plurality of edge pixels indicating the edge image features at the respective pixel locations of the image, and
determining whether a first number of edge pixels within a first end region of the edge detected image exceeds a second number of edge pixels within a second end region of the edge detected image by at least a threshold value, wherein the second end region is a same size as the first end region and is located at an opposite side of the edge detected image from the first end region; and
when the edge image features in the image are not distributed evenly across the image, cropping the image at the bounds of an overlay region of a desired size, wherein the overlay region is set at a position within the image to include a largest number of the edge image features.

13. The non-transitory computer-readable storage medium of claim 12, wherein the operations further comprise:
when the edge image features in the image are distributed evenly across the image, cropping the image at the bounds of the overlay region of the desired size, wherein the overlay region is set at the center of the image.

14. The non-transitory computer-readable storage medium of claim 12, wherein the operations further comprise:
modifying the cropped image to include a label located at one of a plurality of label overlay regions that bounds a least number of edge image features of the cropped image.

15. The non-transitory computer-readable storage medium of claim 12, wherein the image is one of a plurality of images of a video asset, and wherein the operations further comprise:
selecting a representative cropped image, from a plurality of cropped images corresponding to the plurality of images, which has a highest number of edge image features of all the plurality of cropped images.

16. The non-transitory computer-readable storage medium of claim 12, wherein the operations further comprise:
prior to the determining, orienting the image according to an orientation of a plurality of orientations that preserves a largest amount of the image within a boundary of the overlay region.

17. A method in a computing device for performing intelligent weighted image manipulations, the method comprising:
determining whether edge image features are distributed evenly across an image, wherein the determining comprises:
generating an edge detected image from the image, wherein the edge detected image includes a plurality of edge pixels indicating the edge image features at the respective pixel locations of the image, and
determining whether a first number of edge pixels within a first end region of the edge detected image exceeds a second number of edge pixels within a second end region of the edge detected image by at least a threshold value, wherein the second end region is a same size as the first end region and is located at an opposite side of the edge detected image from the first end region; and
when the edge image features in the image are not distributed evenly across the image, cropping the image at the bounds of an overlay region of a desired size, wherein the overlay region is set at a position within the image to include a largest number of the edge image features.

18. The method of claim 17, wherein the first end region and the second end region each correspond to one of two non-overlapping regions created by placing two copies of the overlay region at opposite ends of the edge detected image, wherein the two copies of the overlay region overlap.

* * * * *